United States Patent
Park et al.

(10) Patent No.: US 9,449,349 B2
(45) Date of Patent: Sep. 20, 2016

(54) METHOD OF UPDATING SCROLL BAR IN SCREEN OF USER TERMINAL AND USER TERMINAL FOR UPDATING SCROLL BAR IN SCREEN

(75) Inventors: Chang Hee Park, Yongin-si (KR); In Young Oh, Seoul (KR); Wi Hoon Youn, Seongnam-si (KR); Bo Hwan Jeon, Seoul (KR); Sang Hyuk Lee, Yongin-si (KR)

(73) Assignee: Kakao Corp., Jeju-si, Jeju-do (KR)

( * ) Notice: Subject to any disclaimer, the term of this patent is extended or adjusted under 35 U.S.C. 154(b) by 144 days.

(21) Appl. No.: 13/620,260

(22) Filed: Sep. 14, 2012

(65) Prior Publication Data

US 2013/0073990 A1    Mar. 21, 2013

(30) Foreign Application Priority Data

Sep. 19, 2011    (KR) .......................... 10-2011-0094056

(51) Int. Cl.
G06F 3/0485  (2013.01)
G06F 3/0488  (2013.01)
G06Q 50/00   (2012.01)

(52) U.S. Cl.
CPC ............ G06Q 50/01 (2013.01); G06F 3/0485 (2013.01); G06F 3/0488 (2013.01)

(58) Field of Classification Search
CPC ............ H04L 12/586; H04L 12/581–12/582; H04L 1/04–1/046; G06F 3/0485–3/04855
USPC ....................................................... 715/786
See application file for complete search history.

(56) References Cited

U.S. PATENT DOCUMENTS

| | | | |
|---|---|---|---|
| 6,415,144 B1* | 7/2002 | Findikli et al. | 455/419 |
| 6,583,795 B1* | 6/2003 | Ohyama | 715/785 |
| 7,372,470 B2* | 5/2008 | Kim et al. | 345/593 |
| 8,255,473 B2* | 8/2012 | Eren et al. | 709/207 |
| 2003/0036393 A1* | 2/2003 | Kanefsky | H04M 1/72552 455/466 |
| 2004/0268263 A1* | 12/2004 | Van Dok | G09G 5/14 715/733 |

(Continued)

FOREIGN PATENT DOCUMENTS

| | | |
|---|---|---|
| JP | 2008-4131 | 1/2008 |
| JP | 2008-158008 | 7/2008 |

(Continued)

OTHER PUBLICATIONS

Office Action mailed Nov. 26, 2013 in Japan Application No. 2012-205354.

(Continued)

*Primary Examiner* — Jennifer To
*Assistant Examiner* — Liang Li
(74) *Attorney, Agent, or Firm* — Gilberto M. Villacorta; Jihwang Yeo; Foley & Lardner LLP (57) ABSTRACT

A method of updating a scroll bar in a screen of a user terminal according to an embodiment of the present invention may include displaying a chat window including at least a portion of a chat history among users in a first display area of a touch display, displaying a scroll bar in a second display area of the touch display, storing the new chat message in a temporary memory temporarily upon receipt of the new chatting message, adding the new chat message into the chat history in response to a touch event of the user on the touch display, and updating the scroll bar in response to the new chat message being added into the chat history.

15 Claims, 9 Drawing Sheets

(56) References Cited

U.S. PATENT DOCUMENTS

| | | | |
|---|---|---|---|
| 2008/0104169 A1* | 5/2008 | Combel et al. | 709/204 |
| 2008/0178116 A1* | 7/2008 | Kim | 715/786 |
| 2009/0054090 A1* | 2/2009 | Deng et al. | 455/466 |
| 2009/0070707 A1* | 3/2009 | Schaller et al. | 715/787 |
| 2009/0106686 A1* | 4/2009 | Shin | H04L 51/04 715/781 |
| 2009/0113452 A1* | 4/2009 | Grigsby et al. | 719/318 |
| 2009/0177981 A1* | 7/2009 | Christie et al. | 715/758 |
| 2009/0265643 A1* | 10/2009 | Jachner et al. | 715/758 |
| 2010/0070924 A1* | 3/2010 | Hart et al. | 715/829 |
| 2011/0258577 A1* | 10/2011 | Steelberg et al. | 715/786 |
| 2011/0302525 A1* | 12/2011 | Jeon | 715/786 |
| 2012/0210247 A1* | 8/2012 | Khouri et al. | 715/751 |
| 2013/0014051 A1* | 1/2013 | Lefor et al. | 715/787 |
| 2013/0036357 A1* | 2/2013 | Hendrickson | G06F 3/0485 715/728 |
| 2013/0132891 A1* | 5/2013 | Lee | G06F 3/0485 715/785 |

FOREIGN PATENT DOCUMENTS

| | | |
|---|---|---|
| JP | 2009-187057 | 8/2009 |
| JP | 2010-503121 | 1/2010 |
| KR | 10-0746943 | 8/2007 |
| WO | WO-2007/049405 | 5/2007 |
| WO | WO-2011/043303 A1 | 4/2011 |

OTHER PUBLICATIONS

Office Action issued Aug. 12, 2013 in corresponding Korean Application No. 10-2011-0094056, 5 pgs.

Office Action issued Mar. 13, 2013 in corresponding Korean Application No. 10-2011-0094056, 5 pgs.

Office Action mailed Jul. 1, 2014 in Japan Application No. 2012-205354.

* cited by examiner

METHOD OF UPDATING SCROLL BAR IN
SCREEN OF USER TERMINAL AND USER
TERMINAL FOR UPDATING SCROLL BAR
IN SCREEN

CROSS-REFERENCE TO RELATED
APPLICATION

This application claims the priority benefit of Korean Patent Application No. 10-2011-0094056, filed on Sep. 19, 2011, in the Korean Intellectual Property Office, the disclosure of which is incorporated herein by reference.

BACKGROUND

1. Field of the Invention

The present invention relates to a method of updating a scroll bar in a screen of a user terminal and a user terminal for updating a scroll bar in a screen.

2. Description of the Related Art

With a recent rise in distribution of a portable terminal, the portable terminal is now considered an essential item for everyday life. The portable terminal is functionally being transformed into a multimedia communication device, through which a variety of data transmission services and additional services may be provided, in addition to a voice call unique to each portable terminal.

Also, with developments of communication technology, the portable terminal has been equipped with a function of sending and receiving calls and text messages, and a function of a messenger program that is only available on an existing personal computer (PC). Accordingly, there is a need for a method that allows subscribers to log onto a mobile messenger and have conversations with other subscribers more conveniently.

SUMMARY

An aspect of the present invention provides a method of updating a scroll bar in a screen of a user terminal and a user terminal for updating a scroll bar in a screen, subsequent to a new chat message being added to a chat history.

Another aspect of the present invention also provides a method of updating a scroll bar in a screen of a user terminal and a user terminal for updating a scroll bar in a screen that may display a new chat message to a user differently, based on whether an area of a chat history in which the new chat message is added is present in the chat window.

According to an aspect of the present invention, there is provided a method of updating a scroll bar in a screen of a user terminal, the method including, displaying a chat window including at least a portion of a chat history among users in a first display area of a touch display, displaying a scroll bar in a second display area of the touch display, adding a new chat message into the chat history in response to a touch event of a user on the touch display, and updating the scroll bar in response to the new chat message being added into the chat history.

The updating of the scroll bar may further include adjusting a position or a length of the scroll bar, subsequent to the new chat message being added into the chat history in response to the touch event of the user on the touch display.

The displaying of the scroll bar in the second display area may include displaying the scroll bar in the second display area in response to the touch event of the user occurring on the touch display.

The displaying of the scroll bar in the second display area may include determining a length or a position of the scroll bar based on a relative length or a relative position of the chat window with respect to the chat history.

The updating of the scroll bar may include updating a length or a position of the scroll bar based on a relative length or a relative position of the chat window on the chat history including the new chat message.

The adding of the new chat message into the chat history may include moving the new chat message stored temporarily in the temporary memory to a main memory of the chat history, and deleting the new chat message stored temporarily in the temporary memory.

The method of updating the scroll bar in the screen of the user terminal may further include verifying whether an area in the chat history in which the new chat message is added, wherein the storing of the new chat message temporarily in the temporary memory includes storing the new chat message in the temporary memory temporarily, based on a result of the verification.

The storing of the new chat message temporarily in the temporary memory may include storing the new chat message directly in the main memory of the chat history, when the area of the chat history in which the new chat message is added, is verified to be present in the chat window, and storing the new chat message temporarily in the temporary memory, when the area of the chat history in which the new chat message is added, is verified to be absent in the chat window.

According to another aspect of the present invention, there is provided a user terminal for updating a scroll bar in a screen, the user terminal including a touch display to display a chat window including at least a portion of a chat history among users in a first display area, and to display a scroll bar in a second display area, a main memory to store the chat history among the users, a network module to receive a new chat message via an Internet communication network, a temporary memory to store the new chat message temporarily, and a processor to add the new chat message into the chat history in response to a touch event of a user on the touch display, and to update the scroll bar in response to the new chat message being added into the chat history.

The processor may adjust a position or a length of the scroll bar, subsequent to the new chat message being added into the chat history in response to the touch event of the user on the touch display.

The processor may update a length or a position of the scroll bar, based on a relative length or a relative position of the chat window with respect to the chat history including the new chat message.

The processor may move the new chat message stored temporarily in the temporary memory to the main memory of the chat history, and delete the new chat message stored temporarily in the temporary memory.

The processor may verify whether an area of the chat history in which the new chat message is added is present in the chat window, and store the new chat message temporarily in the temporary memory based on a result of the verification.

The processor may store the new chat message in a main memory of the chat history, when the area of the chat history in which the new chatting message is added is verified to be present in the chat window, and store the new chat message in the temporary memory temporarily, when the area of the chat history in which the new chat message is added is verified to be absent in the chat window.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

When it is determined detailed description related to a related known function or configuration they may make the purpose of the present invention unnecessarily ambiguous in describing the present invention, the detailed description will be omitted here. Also, terms used herein are defined to appropriately describe the exemplary embodiments of the present invention and thus may be changed depending on a user, the intent of an operator, or a custom. Accordingly, the terms must be defined based on the following overall description of this specification.

Figure 1:
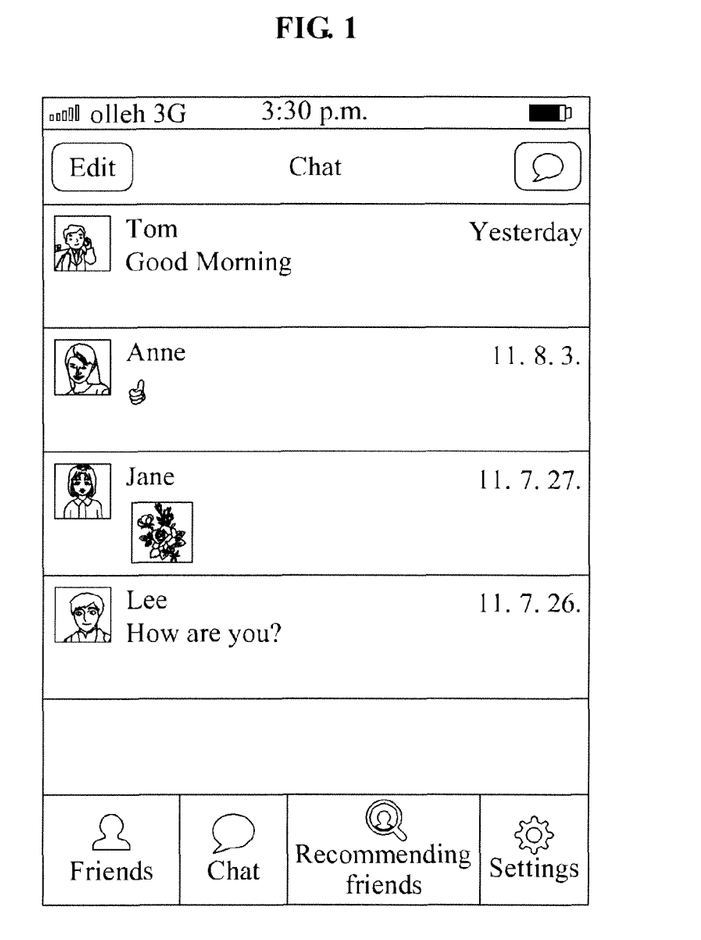
FIG. 1 is a diagram illustrating an initial screen of a mobile messenger for sending and receiving a chat message in a screen of a user terminal according to an embodiment of the present invention.

FIG. 1 is a diagram illustrating an initial screen of a mobile messenger for sending and receiving a chat message in a screen of a user terminal according to an embodiment of the present invention.

The mobile messenger is a program created by optimizing a messenger on a desktop display to a smart phone display may be generally operated in a form of an application. The mobile messenger may send a message containing longer and more complex content than a short message service (SMS), and may be equipped with a variety of functions such as a video chat. A list of acquaintances or friends to whom the chat message is to be sent and received by may be displayed via an initial chat screen. Here, pictures or avatars of the acquaintances may be included along with names of the acquaintances.

When a user selects any one of the acquaintances displayed on the list of acquaintances or friends of FIG. 1, a telephone number of a corresponding acquaintance and an icon for 1:1 chat appear. In this instance, when the user selects the telephone number of the corresponding acquaintance, the user may make a call, and when the user selects the icon for 1:1 chat, the user may initiate an exchange of chat messages with the corresponding acquaintance.

Moreover, a picture, a video, a voice message, and the like may be sent to another user via the mobile messenger. As used herein a user may refer to an acquaintance who is chatting with the user. The mobile messenger may also provide a present a service and a product provided by a specific company to the other user via a function of "sending a present".

Figure 2:
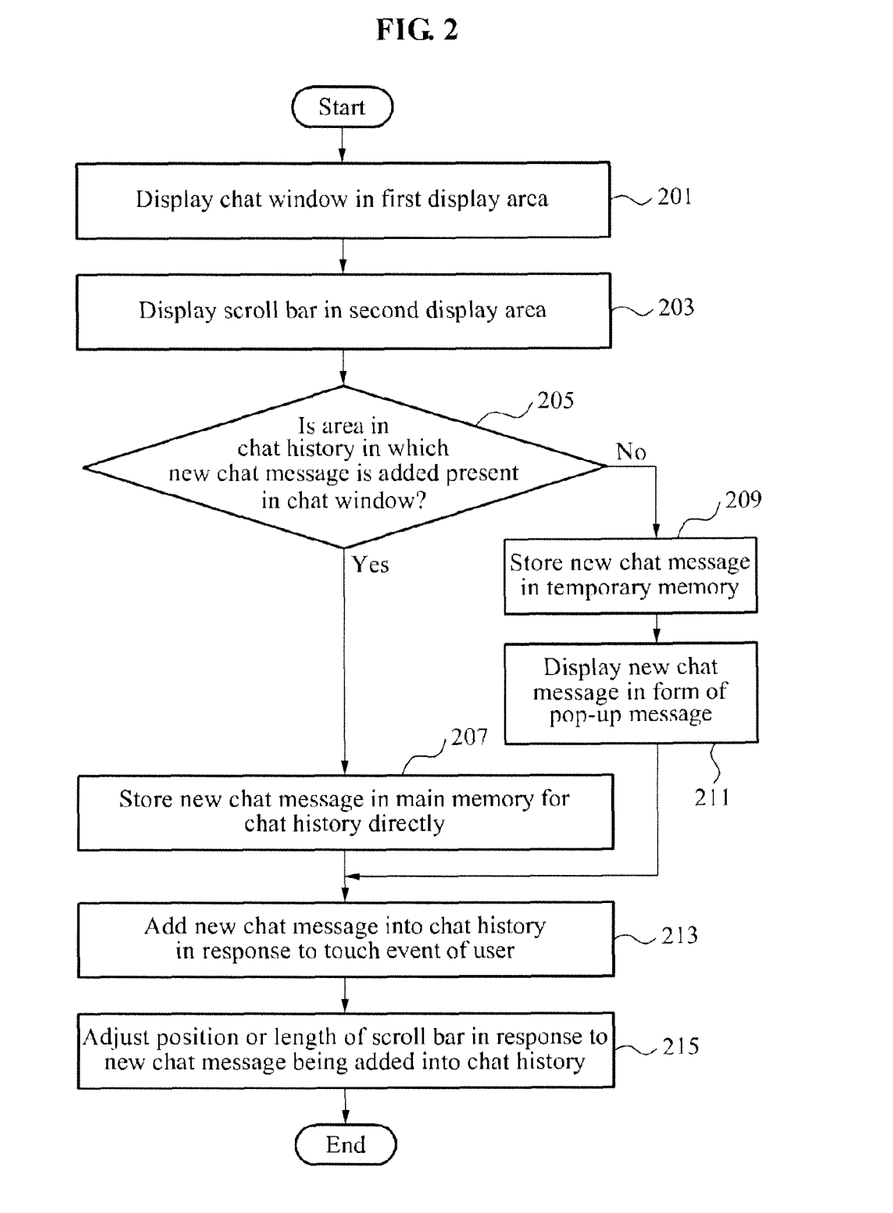
FIG. 2 is a flowchart illustrating a method of updating a scroll bar in a screen of a user terminal according to an embodiment of the present invention.

FIG. 2 is a flowchart illustrating a method of updating a scroll bar in a screen of a user terminal according to an embodiment of the present invention.

In operation 201, the user terminal may display a chat window including at least a portion of a chat history among users in a first display area of a touch display. The first display area may indicate an area in which a chat content is displayed in the touch display.

Here, the "chat history" may refer to a chat record including a text message, a picture, a video, a voice message, and the like associated with a chat that is sent and received between the user of the user terminal and other users, or acquaintances. The "chat history" may be a full chat content that the user may check through a scrolling action and the like on the touch display, provided that the chat record s not deleted by the user.

Also, the "chat window" may refer to the chat record that the user may check directly without an additional operation through the screen of the user terminal, that is, the "chat window" may refer to a portion of the chat history currently displayed to the user through the screen of the user terminal.

In operation 203, the user terminal may display the scroll bar in the second display area of the touch display. The second display area may refer to an area in which the scroll bar appears on the touch display, for example, a far right or far left portion of the touch display.

Figure 3:
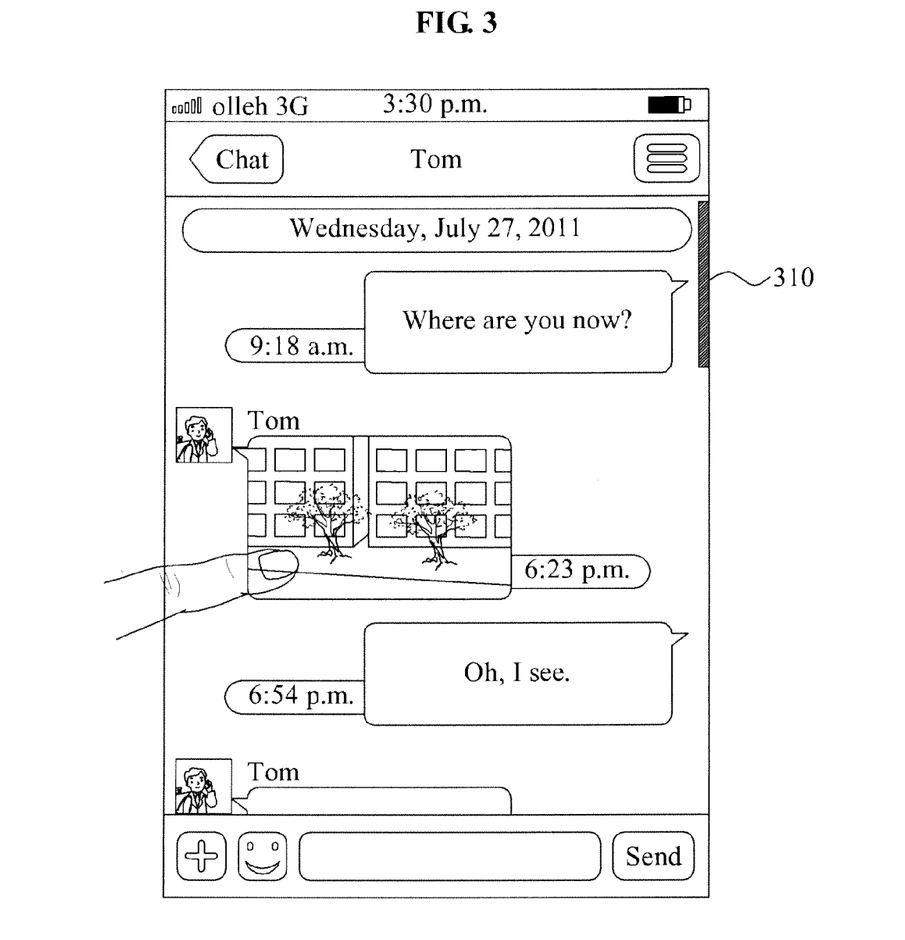
FIG. 3 is a diagram illustrating a screen when a user touches a touch display on which a chat message is displayed according to an embodiment of the present invention.
Figure 4:
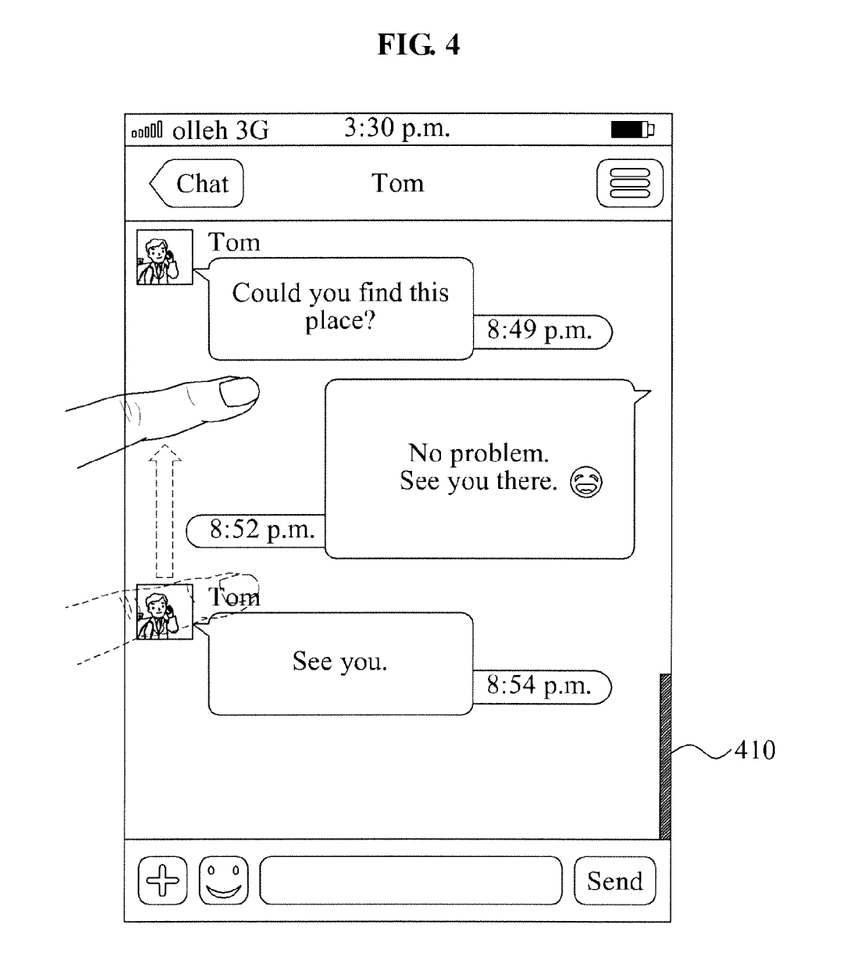
FIG. 4 is a diagram illustrating a screen when a user scrolls through a touch display on which a chat message is displayed according to an embodiment of the present invention.

The user terminal may display the scroll bar in the second display area in response to a touch event of the user occurring on the touch display. Here, the "touch event" may include all user actions of touching and scrolling of the touch display. FIGS. 3 and 4 illustrate the scroll bar being displayed in the second display area of the touch display in response to the touch event of the user occurring on the touch display.

In operation 205, the user terminal may verify whether an area of the chat history in which a new chat message is added is present in the chat window. Here, "an area of the chat history in which a new chat message is added is present in the chat window" may indicate a screen state in which a last portion of the chat history is displayed in a current screen, and the new chat message may be displayed to the user directly. Based on a result of the verification in operation 205, the user terminal may determine whether to store the new chat message temporarily in a temporary memory, or store the new chat message directly in a main memory.

When the area of the chat history in which the new chat message is added is verified to be present in the chat window in operation 205, the user terminal may store the new chat message directly in the main memory of the chat history in operation 207.

A case of the area in the chat history in which the new chat message is added being verified to be present in the chat window will be described with reference to FIG. 5.

When the area in the chat history in which the new chat message is added is verified to be absent in the chat window in operation 205, the user terminal may store the new chat message temporarily in the temporary memory in operation 209.

Here, "the area in the chat history in which the new chat message is added is verified to be absent in the chat window" may indicate a screen state in which a first or a middle portion of the chat history is displayed in a current screen, and the new chat message may not be displayed to the user directly. A case of the area in the chat history in which the new chat message is added being verified to be absent in the chat window will be described with reference to FIG. 6.

In operation 211, the user terminal may display in the screen the new chat message stored in the temporary memory, in a form of, for example, a pop-up message, and the like. Through displaying the new chat message in such a form, the user terminal may notify the user that the chat message is received not in a form of the chat message, but rather in a different form.

In operation 213, the user terminal may add the new chat message in the chat history in a response to the touch event of the user on the touch display. The user terminal may move the new chat message stored temporarily in the temporary memory to the main memory of the chat history in operation 213. Subsequently, the user terminal may delete the new chat message stored temporarily in the temporary memory.

In operation 215, the user terminal may adjust a position or a length of the scroll bar, subsequent to the new chat message being added into the chat history in response to the touch event of the user on the touch display.

The user terminal may update the scroll bar in response to the new chat message being added into the chat history. Here, the user terminal may update the length or the position of the scroll bar based on a relative length or a relative position of the chat window with respect to the chat history including the new chat message.

Figure 7:
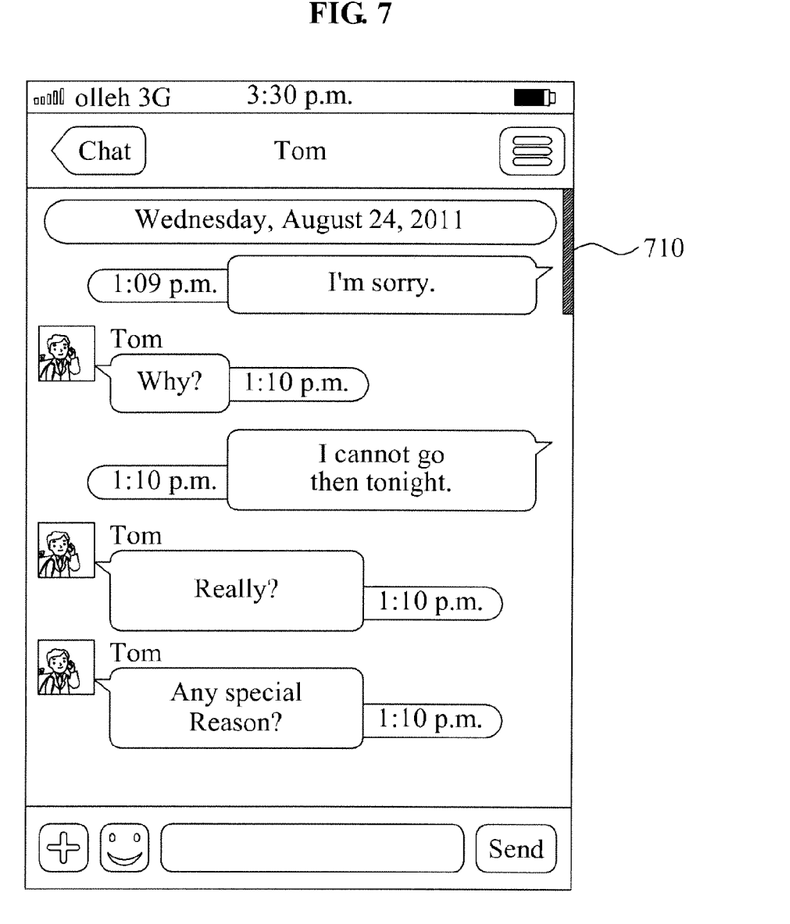
FIG. 7 is a diagram illustrating a screen prior to a scroll bar being updated in a screen of a user terminal according to an embodiment of the present invention.
Figure 8:
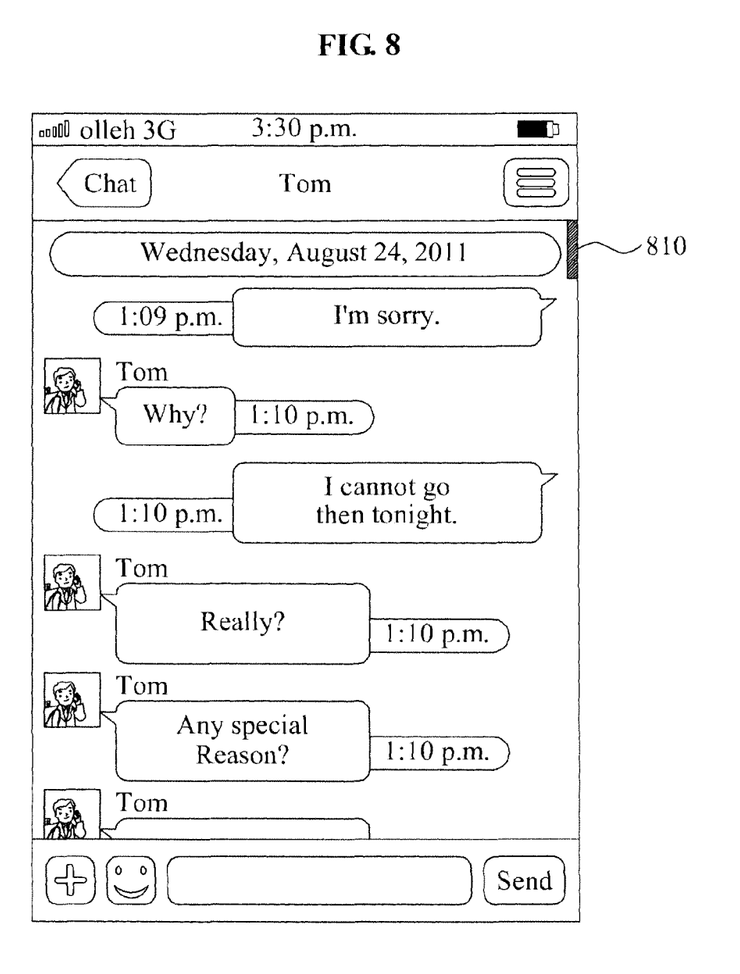
FIG. 8 is a diagram illustrating a screen subsequent to a scroll bar being updated in response to a new chat message being added into a chat history, in a screen of a user terminal according to an embodiment of the present invention.

A method of updating the length or the position of the scroll bar will be set forth by describing a change in the length of the scroll bar prior to and subsequent to the new chat message being added into the chat history with reference to FIG. 7 and FIG. 8.

FIG. 3 is a diagram illustrating a screen when a user touches a touch display on which a chat message is displayed according to an embodiment of the present invention.

FIG. 3 illustrates a first portion of a chat history that is displayed via the touch display. A name of another user chatting with the user may be displayed on a top of the screen, and information with respect to a date and a day on which the chat is currently taking place is displayed below the top of the screen.

Here, a chat content of the other user and the chat content of the user may be distinguishable through being displayed in corresponding directions. For example, since the chat content sent by the user is displayed on a left side of the screen and the chat content sent by the other user is displayed on a right side of the screen, the user may be able to easily determine which conversation is taking place between the user and the other user. Accordingly, a method of displaying the conversation distinguished into the conversation of the user and the conversation of the another user may be applied not only to a single person but also to multiple persons, for example, a group chat.

In FIG. 3, when the user touches the screen of the touch display in a state in which the screen is blank, a scroll bar 310 may appear on a right side of the screen. Here, a length of the scroll bar 310 displayed in the screen may be determined by a relative length of a chat window with respect to the chat history. For example, when a length of the chat content displayed in the chat window is longer than a length of the chat history, the length of the scroll bar 310 may be increased. Conversely, when the length of the chat content displayed in the chat window is shorter than the length of the chat history, the length of the scroll bar 310 may be decreased.

FIG. 4 is a diagram illustrating a screen when a user scrolls through a touch display on which a chat message is displayed according to an embodiment of the present invention.

The screen of FIG. 4 is a last portion of a chat content on the touch display that is displayed by scrolling a finger touched on the touch display.

When the finger touch on the touch display in a first portion of the chat history is one of scrolling by moving the finger in an upward direction as shown in FIG. 3, the scroll bar 310 may move in a downward direction, gradually. Here, a position of the scroll bar 310 that is moving may indicate a relative position of the chat window with respect to the chat history. That is, when a current chat window displays a position that corresponds to one third of a full chat history, the position of the scroll bar 310 may be displayed at a position that corresponds to one third of the position of a second display area.

When the last portion of the chat history appears in the chat window, a scroll bar 410 may reach a very last portion of the second area as shown in FIG. 4. Accordingly, a length or a position of the scroll bar that is displayed on the touch display may be determined based on a relative length or a relative position of the chat window with respect to the chat history.

Figure 5:
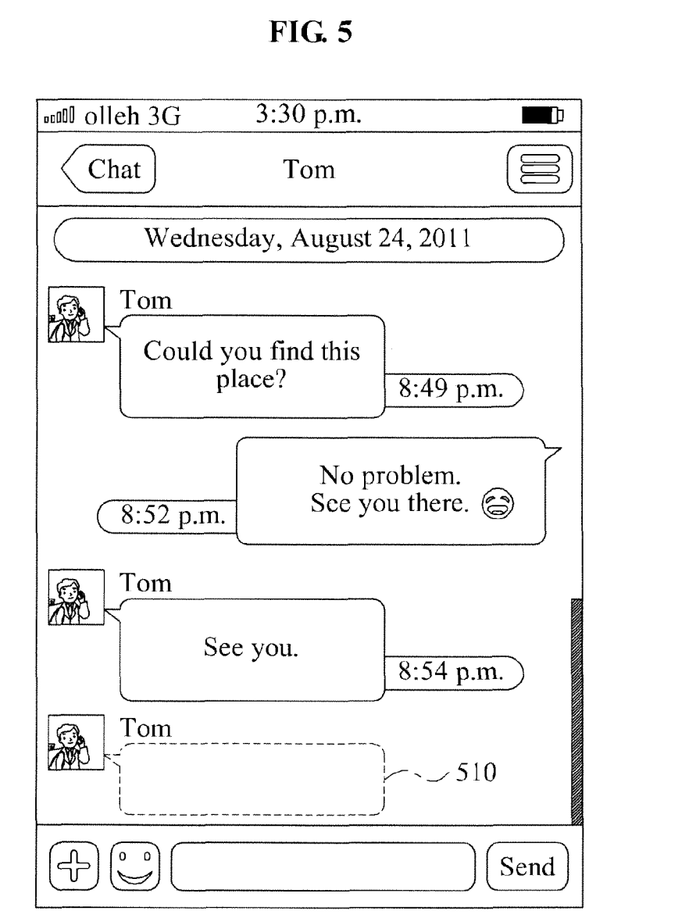
FIG. 5 is a diagram illustrating a method of displaying a new chat message when an area in which a new chat message is added is present in a chat window, in a screen of a user terminal according to an embodiment of the present invention.

FIG. 5 is a diagram illustrating a method of displaying a new chat message when an area in which a new chat message is added is present in a chat window, in a screen of a user terminal according to an embodiment of the present invention.

As described above, "an area in which a new chat message is added is present in a chat window" may indicate a screen state in which a last portion of a chat history is displayed in a current screen, and the new chat message may be displayed to the user directly. In this instance, the new chat message may be stored directly in a main memory of the chat history.

Further, the new chat message may be added in a portion marked by a dotted line as in 510 in the last portion of the chat history. Accordingly, the user may immediately check the new chat message. Here, as the new chat message is added in the last portion of the chat history, an earlier portion of the chat history may be moved to an upper portion of the chat window to occupy a portion of the chat window corresponding to a portion of the chat window occupied by the new chat message.

Figure 6:
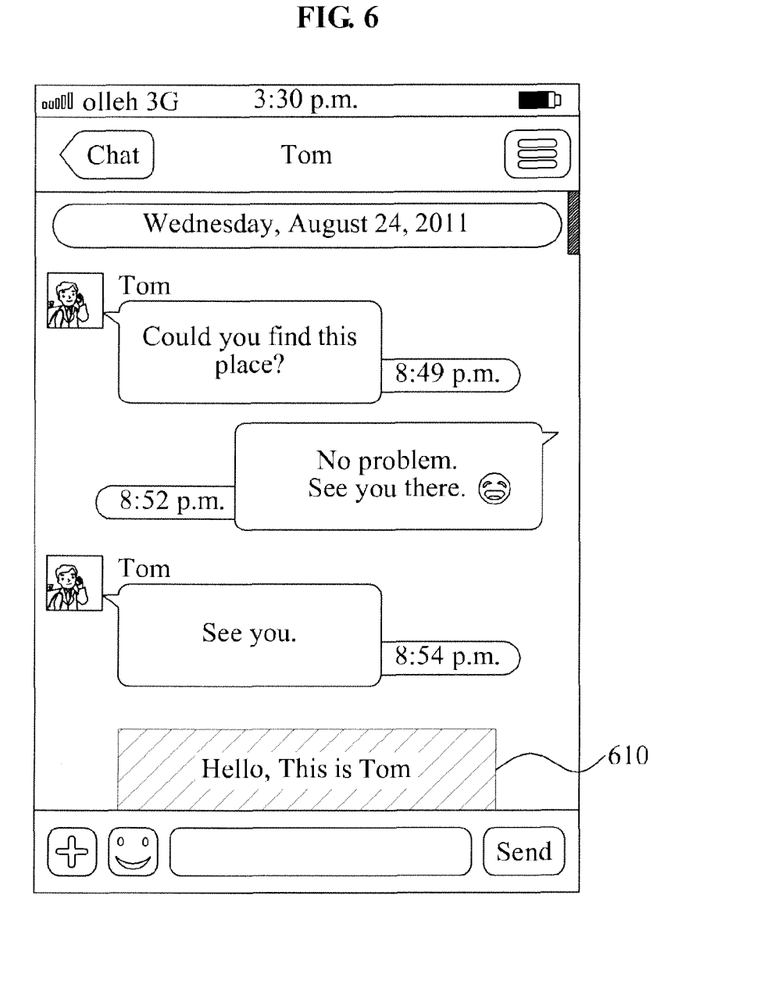
FIG. 6 is a diagram illustrating a method of displaying a new chat message when an area in which a new chat message is added is absent in a chat window, in a screen of a user terminal according to an embodiment of the present invention.

FIG. 6 is a diagram illustrating a method of displaying a new chat message when an area in which a new chat message is added is absent in a chat window, in a screen of a user terminal according to an embodiment of the present invention.

As described above, "an area in which a new chat message is added is absent in a chat window" may indicate a screen state in which a first or a middle portion of a chat history is displayed in a current screen, and the new chat message may not be directly displayed to a user. That is, the screen state may be a state in which a chat message arrives while the user is viewing a portion of the chat history that does not correspond to a last portion, but rather the first or the middle portion.

Here, the new chat message may be stored temporarily in a temporary memory, and only a portion of the chat message may be displayed in a form of a pop-up message as in 610.

When the user touches the pop-up message, the user terminal adds the new chat message into the chat history in response to a touch event of the user. Also, the user terminal may store the new chat message stored in the temporary memory by moving the new chat message to a main memory. The user terminal may refresh the temporary memory by deleting the new chat message stored temporarily in the temporary memory.

FIG. 7 is a diagram illustrating a screen prior to a scroll bar being updated in a screen of a user terminal according to an embodiment of the present invention. FIG. 8 is a diagram illustrating a screen subsequent to a scroll bar being updated in response to a new chat message being added into a chat history, in a screen of a user terminal according to an embodiment of the present invention.

As described with reference to FIG. 5, as the new chat message is added in a last portion of a chat history, an earlier portion of the chat history may be moved to an upper portion of a chat window, occupying as much a portion as occupied by the new chat history. Here, since a length of the scroll bar indicates a relative length of the chat window with respect to the chat history, the length of the scroll bar may change correspondingly, when the new chat message is added into the chat history. Here, in updating the scroll bar, the user terminal may update a length or a position of the scroll bar based on a relative length or a relative position of the chat window with respect to the chat history including the new chat message.

As an example, a case in which a length of the chat history is 20 centimeters (cm), a length of the chat window is 10 cm, and a length of a scroll bar 710 is 2 cm is shown in FIG. 7. In this example, when a 5 cm long new chat message is received from another user, a full length of the chat history may be 25 cm. Here, the full length of the chat history into which the new chat history is added increases by 20% when compared to the full length of the chat history prior to the new chat history being added. Accordingly, a length of a scroll bar 810 being updated as shown in FIG. 8 may be 1.6 cm that is reduced by 20% when compared to a 2 cm length.

Figure 9:
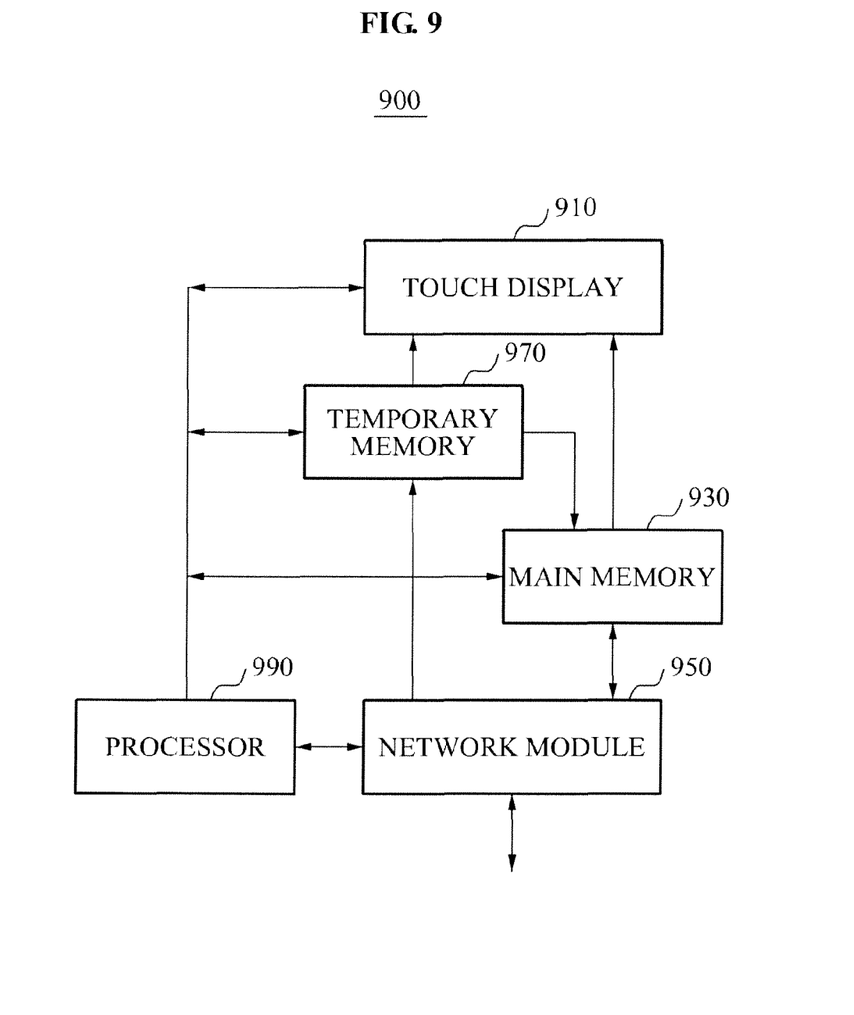
FIG. 9 is a block diagram illustrating a user terminal for updating a scroll bar according to an embodiment of the present invention.

FIG. 9 is a block diagram illustrating a user terminal for updating a scroll bar according to an embodiment of the present invention.

The user terminal for updating the scroll bar may include a touch display 910, a main memory 930, a network module 950, a temporary memory 970, and a processor 990.

The touch display 910 is a user interface device that may detect a touch position and execute a specific processing method using stored software when input devices such as a human hand, a stylus pen, and the like touch a letter or a specific position displayed in a screen without using a keyboard. An example of the touch display 910 may include resistive overlay, capacitive overlay, surface acoustic wave, and infrared beam. Also, a touch display of a multi-touch input method extracting several touch points may be employed.

The touch display 910 may display a chat window that includes at least a portion of a chat history among users in a first display area, and display a scroll bar in a second display area.

The main memory 930 may store the chat history among the users. Here, the users may indicate users who subscribe to a mobile messenger identical to the mobile messenger of a user of the user terminal and perform a chat.

The network module 950 may receive the new chat message via an Internet communication network.

The temporary memory 970 may store the new chat message temporarily. The temporary memory 970, as a portion of the main memory 930, may be a storage area that is distinguished from an area in which the chat history among the users is stored. For example, the temporary memory 970 may be a storage device separate from the main memory 930, such as a temporary buffer, a registry, and the like.

The processor 990 may add the new chat message into the chat history in response to a touch event of the user on the touch display 910, and update the scroll bar in response to the new chat message being added into the chat history. For example, in a screen as shown in FIG. 6, when the user touches a pop-up message displayed in the screen of the touch display 910, the user terminal may store the new chat message stored in the temporary memory 970 in the main memory 970 in response to the touching of the pop-up message, and at the same time add the new chat message into the chat history.

The processor 990 may adjust a length or a position of the scroll bar, subsequent to the new chat message being added into the chat history in response to the touch event of the user on the touch display 910. The processor 990 may update the length or the position of the scroll bar based on a relative length or a relative position of the chat window with respect to the chat history including the new chat message.

The processor 990 may move the new chat message stored temporarily in a temporary memory 970 in the main memory 930, and delete the new chat message stored temporarily in the temporary memory 970.

The processor 990 may verify whether an area in the chat history in which the new chat message is added is present in the chat window, and based on a result of the verification, store the new chat message in the temporary memory 970 temporarily. That is, when the area in the chat history in which the new chat message is added is to be verified to be present in the chat window, the processor 990 may store the new chat message in main memory 930 of the chat history directly.

Also, when the area in the chat history in which the new chat message is added is verified to be absent in the chat window, the processor 990 may store the new chat message in the temporary memory 970 temporarily.

According to embodiments of the present invention, there is provided a method of updating a scroll bar in a screen of a user terminal and a user terminal for updating a scroll bar in a screen, subsequent to a new chat message being added into a chat history.

According to embodiments of the present invention, it is possible to display a new chat message to a user, by verifying whether an area in which the new chat message is added is present in a chat window.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of updating a scroll bar in a screen of a user terminal of a user, the method comprising:
   displaying at least a portion of a chat history including a plurality of chat messages inputted by the user and at least one other user at a chat window in a first display area of a touch display;
   displaying a scroll bar in a second display area of the touch display;
   adding a new chat message inputted by the other user into the chat history based on the portion of the chat history which is displayed in a current screen of the touch display; and
   updating the scroll bar in response to the new chat message being added into the chat history,
   wherein the new chat message is added into the chat history when a last portion of the chat history is displayed in the current screen of the touch display, and
   wherein the new chat message is not added into the chat history, the scroll bar is not updated, and a portion or an entirety of the new chat message is displayed at the chat window in a different form than a form of the chat history, when the last portion of the chat history is not displayed in the current screen of the touch display,
   wherein the new chat message displayed at the chat window in the different form is added into the chat history in response to an event including when a touch of the user occurs with respect to the new chat message displayed in the different form on the touch display or when the last portion of the chat history is displayed according to a scrolling of the user.

2. The method of claim 1, further comprising:
   storing the new chat message temporarily in a temporary memory.

3. The method of claim 1, wherein the updating of the scroll bar further comprises:
   adjusting a position or a length of the scroll bar, subsequent to the new chat message being added into the chat history in response to the touch event of the user on the touch display.

4. The method of claim 1, wherein the displaying of the scroll bar in the second display area comprises:
   displaying the scroll bar in the second display area in response to the touch event of the user occurring on the touch display.

5. The method of claim 1, wherein the displaying of the scroll bar in the second display area comprises:
   determining a length or a position of the scroll bar based on a relative length or a relative position of the chat window with respect to the chat history.

6. The method of claim 1, wherein the updating of the scroll bar comprises:
   updating a length or a position of the scroll bar based on a relative length or a relative position of the chat window on the chat history comprising the new chat message.

7. The method of claim 1, wherein the adding of the new chat message into the chat history comprises:
   moving the new chat message stored temporarily in the temporary memory to a main memory of the chat history; and
   deleting the new chat message stored temporarily in the temporary memory.

8. The method of claim 1, further comprising:
   verifying whether an area in the chat history in which the new chat message is added is present in the chat window,
   wherein the storing of the new chat message temporarily in the temporary memory comprises:
   storing the new chat message in the temporary memory temporarily, based on a result of the verification.

9. The method of claim 8, wherein the storing of the new chat message temporarily in the temporary memory comprises:
   storing the new chat message directly in the main memory of the chat history, when the area of the chat history in which the new chat message is added, is verified to be present in the chat window; and
   storing the new chat message temporarily in the temporary memory, when the area of the chat history in which the new chat message is added, is verified to be absent in the chat window.

10. A user terminal for updating a scroll bar in a screen, the user terminal of a user comprising:
    a touch display to display at least a portion of a chat history including a plurality of chat messages inputted by the user and at least one other user at a chat window in a first display area, and to display a scroll bar in a second display area;
    a network module to receive a new chat message inputted by the other user; and
    a processor to add the new chat message into the chat based on the portion of the chat history which is displayed in a current screen of the touch display, and to update the scroll bar in response to the new chat message being added into the chat history,
    wherein the new chat message is added into the chat history when a last portion of the chat history is displayed in the current screen of the touch display, and
    wherein the new chat message is not added into the chat history, the scroll bar is not updated, and a portion or an entirety of the new chat message is displayed at the chat window in a different form than a form of the chat history, when the last portion of the chat history is not displayed in the current screen of the touch display wherein the new chat message displayed at the chat window in the different form is added into the chat history in response to an event including when a touch of the user occurs with respect to the new chat message displayed in the different form on the touch display or when the last portion of the chat history is displayed according to a scrolling of the user.

11. The user terminal of claim 10, wherein the processor adjusts a position or a length of the scroll bar, subsequent to the new chat message being added into the chat history in response to the touch event of the user on the touch display.

12. The user terminal of claim 10, wherein the processor updates a length or a position of the scroll bar, based on a relative length or a relative position of the chat window with respect to the chat history comprising the new chat message.

13. The user terminal of claim 10, further comprising:
a temporary memory to store the new chat message temporarily; and
a main memory to store the chat history,
wherein the processor moves the new chat message stored temporarily in the temporary memory to the main memory of the chat history, and deletes the new chat message stored temporarily in the temporary memory.

14. The user terminal of claim 10, further comprising:
a temporary memory to store the new chat message temporarily; and
a main memory to store the chat history,
wherein the processor verifies whether an area of the chat history in which the new chat message is added is present in the chat window, and stores the new chat message temporarily in the temporary memory based on a result of the verification.

15. The user terminal of claim 14, wherein the processor stores the new chat message in a main memory of the chat history, when the area of the chat history in which the new chatting message is added is verified to be present in the chat window, and stores the new chat message in the temporary memory temporarily, when the area of the chat history in which the new chat message is added is verified to be absent in the chat window.

* * * * *